(12) United States Patent
Baird (10) Patent No.: US 9,901,854 B1
(45) Date of Patent: Feb. 27, 2018

(54) WATER FILTER CARTRIDGE WITH IMPROVED LEAK INDICATOR

(71) Applicant: Michael T. Baird, Temecula, CA (US)

(72) Inventor: Michael T. Baird, Temecula, CA (US)

( * ) Notice: Subject to any disclaimer, the term of this patent is extended or adjusted under 35 U.S.C. 154(b) by 177 days.

(21) Appl. No.: 15/004,621

(22) Filed: Jan. 22, 2016

Related U.S. Application Data

(60) Provisional application No. 62/106,640, filed on Jan. 22, 2015, provisional application No. 62/134,491, filed on Mar. 17, 2015.

(51) Int. Cl.
*B01D 35/143* (2006.01)
*B01D 35/30* (2006.01)
*C02F 1/00* (2006.01)

(52) U.S. Cl.
CPC ......... *B01D 35/143* (2013.01); *B01D 35/306* (2013.01); *C02F 1/001* (2013.01); *C02F 2201/004* (2013.01)

(58) Field of Classification Search
None
See application file for complete search history.

(56) References Cited

U.S. PATENT DOCUMENTS

| | | |
|---|---|---|
| RE34,031 E | 8/1992 | Thomsen et al. |
| RE34,050 E | 9/1992 | Thomsen et al. |
| 6,027,644 A | 2/2000 | Magnusson et al. |
| 8,216,463 B1 | 7/2012 | Baird |

*Primary Examiner* — Chester T Barry
(74) *Attorney, Agent, or Firm* — Stetina Brunda Garred & Brucker; Lowell Anderson (57) ABSTRACT

A water filter cartridge for refrigerators is configured to indicate leakage when a cartridge is installed in a manifold having a larger diameter, male inlet and a smaller diameter, coaxial, male outlet. The filter cap has a cylindrical recess that mates with an O-ring on the manifold inlet during use. A fluid passageway extends through the wall forming that recess and opens immediately adjacent that O-ring to carry any leaking water to the outside of the filter cap. The filter cap has a seal on a smaller diameter recess that mates with the sidewall of the male inlet at a distal end thereof. The smaller diameter recess may have slots that allow water to bypass seals on the male outlet member. Under normal water pressure the system will immediately visually exhibit a substantial leak if the filter cartridge is incorrectly coupled to the manifold.

44 Claims, 6 Drawing Sheets

WATER FILTER CARTRIDGE WITH IMPROVED LEAK INDICATOR

CROSS-REFERENCE TO RELATED APPLICATIONS

The application claims the benefit under 35 U.S.C. § 119(e) to Provisional Patent Application No. 62/106,640 filed Jan. 22, 2015, and Provisional Patent Application No. 62/134,491 filed Mar. 17, 2015 the entire contents of which are incorporated herein by reference.

STATEMENT RE: FEDERALLY SPONSORED RESEARCH/DEVELOPMENT

Not Applicable

BACKGROUND

The present invention relates to the purification of drinking water, and more particularly, to replaceable filter cartridges used in household water filtration systems.

Many refrigerators are equipped with door-mounted drinking water and ice dispensers. Purified water is often supplied to such refrigerators via copper and plastic water supply lines from water filtration systems located under the kitchen sink. Some refrigerators, such as those sold under the GE® and HOTPOINT® brands, incorporate their own dedicated water filtration system of the type disclosed in U.S. Pat. No. 5,753,107 of Magnusson et al. Those dedicated filtration systems employ a removable filter cartridge which is typically replaced about every three months. The filter cartridge is located in the interior of the refrigerator and mates with a manifold using a bayonet locking scheme. The cartridge has a female end with a larger diameter, cylindrical recess and a concentric smaller diameter, cylindrical recess that depends from the larger diameter, cylindrical recess. The larger diameter, and smaller diameter, cylindrical cavities of the female end of the filter cartridge provide mating surfaces that mate with correspondingly sized male cylindrical bodies of the manifold, which are surrounded by O-rings to provide water-tight seals. Water passes through a spring biased inlet valve of the water filtration system into the cylindrical filter cartridge. The inlet valve cooperates with the filter cartridge to prevent forward flow of water until the filter cartridge is properly seated on the manifold via insertion and twisting. Water then passes from the inlet valve, downwardly to the bottom of the filter cartridge, and then upwardly through a core of the filter cartridge that contains various filtration media. Filtered water then exits the filter cartridge back into the manifold and passes through an outlet check valve that prevents back flow. The filtered water is then delivered to the ice maker and to the water dispenser.

These replacement filter cartridges do not have any O-rings located adjacent their mating surfaces and therefore to ensure against leaks the water filtration system is totally dependent on the integrity of the O-rings that surround the outside of the larger diameter and smaller diameter, male cylindrical bodies of the manifold to prevent water leakage. A slow leak in the water filtration system resulting from improper installation of the filer cartridge or failure of the O-rings that surround the male cylindrical bodies of the manifold may go unnoticed by the homeowner, leading to a larger diameter, amount of water leaking into the refrigerator and eventually onto the floor of the kitchen when finally discovered. Replacement filter cartridges for the aforementioned refrigerators may include an additional O-ring mounted in the bottom corner of the larger diameter, cylindrical recess of the filter cartridge in order to provide additional sealing capability.

A water filter cartridge is described in U.S. Pat. No. 8,216,463 that alters the water seal location between the manifold and the cartridge in the aforementioned water filtration systems and provides an indication of a leak immediately upon installation of the filter cartridge so that incorrect installation can be readily corrected and major water leakage avoided. That improved cartridge provides an open-sided, radial channel having a U-shaped cross section and that channel allows water leaking past the O-ring seals on the male projections to pass through the channel so that a user can look into the channel to check for water in order to see if a newly installed cartridge is leaking or to check for leaks thereafter. But the sealing ring is located at the bottom of a recess and requires that the U-shaped channel extend quite a distance along the length of the cartridge. The resulting disruption in the continuity of the cylindrical wall caused by the U-shaped channel weakens the wall. Additionally, the seal arrangement used in that patent is not compatible with more recent appliances which have manifolds that place protrusions such as radial ridges on a shoulder between the larger diameter and smaller diameter, male projections that extend from the manifold, so the radial ridges contact the O-ring seal used in that '463 patent and prevent a suitable water-tight seal from forming.

There is thus a need for a more convenient way to identify leaks in a wider variety of appliances, including appliances with protrusions on the end of the manifold members. There is also a need for a leak indicator that cooperates with the existing seals of the manifold. Also, because a channel with a U-shaped cross section weakens the annular wall bearing the mounting lugs, used to connect to the refrigerator manifold, there is a further need in some applications for a stronger connection while still allowing for leak checking.

Further, the U-shaped channel shown in U.S. Pat. No. 8,216,463 opens into an intervening chamber that surrounds the channel. Water leaking past the seal and into the U-shaped channel may fall into that chamber and be concealed from view if the amount of water is small. There is thus a need for an improved leak detection device that more readily shows a leaky seal resulting from an improper replacement of a water filter cartridge in a refrigerator or other appliance having replaceable water filters.

BRIEF SUMMARY

A water filter cartridge is provided that is adapted to mate with a manifold of a water filtration system to hold the filter cartridge in an operative position when placed into position to engage the manifold. The manifold has a shorter, larger diameter, diameter male cylindrical body. A smaller diameter, diameter, male cylindrical body extends axially from a center of the larger diameter, male cylindrical body. Significantly, the larger diameter, diameter, male cylindrical body advantageously, but optionally, has a distal, end surface with small protrusions thereon, such as radial ribs that inhibit sealing against that distal, end surface. The manifold has one portion of a bayonet lock for holding the cartridge in the operative position. The cartridge described hereafter seals against the manifold and indicates whether or not a water-tight seal is provided despite these protrusions, while avoiding the disruption provided by the protrusions.

The water filter cartridge includes an outer housing and a water filtration media inside that housing. A filter cap is affixed to an end of the housing to enclose the filtration media within the filter housing. The cap has a wall with a distal rim and outwardly extending flanges forming a second portion of the bayonet lock, although the flanges may extend from the housing instead of the cap. The cap's wall defines a larger diameter, female, cylindrical recess positioned between the manifold flanges during use. That female recess is sized to receive the larger diameter, diameter, male cylindrical body of the manifold during use and to seal against that larger diameter body using a first sealing ring that encircles that larger diameter body. A leak indicator passageway extends through the wall forming the larger diameter, female recess. The leak indicator passageway has a bottom located immediately adjacent a top of the first sealing ring. That allows the wall to be much stronger than the prior art which extended a slot almost all the way to the bottom of that larger recess. Also, the leak indicator passageway can open onto a top rim of the wall to form a slot, or it can be a closed passageway extending through the wall and thus providing an even stronger wall around that first recess The filter cap also has a second portion defining a smaller diameter, cylindrical recess concentric to the larger diameter, female cylindrical recess with the second portion having a second wall depending in an axial direction. The smaller diameter, cylindrical recess is sized to receive the smaller diameter, male cylindrical body of the manifold during use and seal against that smaller diameter, male body. The smaller diameter male body typically has two sealing rings encircling it. Advantageously, the smaller diameter, cylindrical recess has longitudinal slots that allow water to flow around these two sealing rings on the smaller diameter male body. The bottom of the smaller diameter, cylindrical recess helps form a groove containing a sealing ring on the recess that abuts a side of the distal end of the smaller diameter, male body to form a water tight seal.

The filter cap thus has a leak indicator in the form of a leak indicator passageway that may be a closed passageway or an open sided slot, both of which preferably pass through the cap's wall that forms the larger diameter, female, cylindrical recess that seals against the larger diameter male member of the manifold. The larger diameter male projection seals against that larger diameter, interior, cylindrical recess by use of an annular seal, typically an O-ring seal. That O-ring seal is located adjacent to but above the distal end surface on which the ribs are located, on an opposing end of the larger diameter male projection.

The indicator passageway advantageously has the bottom of one open end located just inward of the middle of that O-ring seal and the top of that seal. As the O-ring seal abuts the cylindrical wall it deforms slightly against that cylindrical wall to form a water tight seal along that deformed, contacting area between the O-ring sealing ring and the abutting wall. The bottom of the indicator passageway preferably does not extend so far into this deformed, contacting area as to adversely affect the ability of the sealing ring to prevent water leakage. Because the bottom of the indicator passageway is close to this O-ring sealing ring, water leaking past that sealing ring readily enters the indicator passageway where it may be detected visually or by other means, and preferably by having leaking water pass through the leak indicator passageway to an exterior of the filter cap.

The leak indicator passageway can thus advantageously extend from adjacent a middle of the O-ring seal on the larger diameter, male projection of the manifold, to the top rim of the filter caps' wall. If a small sized, closed, leak indicator passageway extends through the filter caps' wall the structural integrity of the wall is improved since the wall surrounds the periphery of the passageway—but leak detection may be affected as a tubular passageway is used to check for leaks. If the leak indicator passageway has one side of the passageway opening onto the top rim of the filter cap, then an indicator slot is formed. But because the slot extends along an axial length of the recess the wall containing the slot may have to be strengthened to accommodate the slot in the wall formed by the indicator slot. The nature of the leak checking will advantageously accommodate the type of indicator passageway that is used. A single leak indicating slot or a single, closed or close-sided passageway may be used, or multiple indicator passageways or indicator slots may be used.

There is thus advantageously provided a water filter cartridge for use with a manifold of a water filtration system where the manifold has a smaller diameter male outlet fitting that extends coaxially from a larger diameter, male inlet fitting. The manifold also has a first sealing ring encircling the inlet fitting and second and third sealing rings each encircling the outlet fitting. The water filter cartridge an outer housing and a water filtration media inside the housing. The cartridge also includes a filter cap affixed to an end of the housing to enclose the filtration media within the housing. The filter cap includes a first wall defining a first, larger diameter recess configured to receive the male inlet fitting during use and form a water tight seal with the first sealing ring. The first wall has a leak indicator passageway extending therethrough. The leak indicator passageway is located such that during use a bottom of a first end of the passageway opens onto the first recess between a top portion of the first sealing ring and a top rim of the first wall. The filter cap also includes a second wall defining a second, smaller diameter recess configured to receive the male outlet fitting during use. The second wall forms part of a groove for a fourth sealing ring that seals against the male outlet fitting during use. The second wall also has a bypass recess extending along a predetermined length of the second recess a distance sufficient to allow water to bypass the second and third sealing ring during use.

Advantageously, the filter cap may be varied by having the leak indicator passageway open onto the top rim of the first wall. Additionally, the leak indicator passageway may have closed sidewalls to form a tunnel through the first wall. The first sealing ring is preferably an O-ring having an undeformed diameter D such that the bottom of the first end of the leak indicator passageway opens between a location that is at about the top of the first sealing ring during use, and a location 0.2 D below the top of the first sealing ring during use.

In more detail, a water filter cartridge is adapted to mate with a manifold of a water filtration system to hold the filter cartridge in an operative position when the cartridge is twisted about a longitudinal axis of the manifold and filter cartridge to engage the manifold. The manifold has a larger diameter, male, cylindrical body encircled by a first, larger diameter sealing ring. The manifold also has a smaller diameter, male cylindrical body encircled by a second, smaller diameter sealing ring. The smaller diameter, male cylindrical body extends axially from the center of the larger diameter, male cylindrical body. The manifold also has a first portion of a bayonet lock for holding the cartridge in the operative position, with the larger and smaller diameter male, cylindrical bodies extending along the longitudinal axis.

The filter cartridge used with this manifold comprises an outer housing and a water filtration media inside the housing. A filter cap is affixed to an end of the housing to thereby enclose the filtration media. The filter cap has a rim with a second portion of the bayonet lock. The filter cap also has a first wall defining a larger diameter, female cylindrical recess positioned between the flanges and sized to receive the larger diameter, male cylindrical body of the manifold during use to form a water tight seal with the first sealing ring. The filter cap further has a second wall defining a smaller diameter, cylindrical recess concentric with the larger diameter, female cylindrical recess and depending in an axial direction. The smaller diameter, cylindrical recess is sized to receive the smaller diameter, male cylindrical body of the manifold during use. The first portion of the filter cap that defines the larger diameter, cylindrical recess has an inlet port positioned to allow the inflow of unfiltered water from the manifold for passage through the filtration media. The second portion of the filter cap that defines the smaller diameter, cylindrical recess has an outlet port positioned to allow the outflow of filtered water to the manifold. Importantly, the first wall has a leak indicator passageway that has a first end in fluid communication with the first recess and a second end in fluid communication with an exterior of the filter cap. The leak indicator passageway also has a bottom at the opening to the first recess which bottom is at a predetermined location that is immediately adjacent the first seal during use of the filter cartridge.

In further variations, the filter cartridge has at least one sealing ring located in a groove formed at least partially in the second recess and encircling the second recess and longitudinal axis. The filter cartridge may also have at least one slot extending along a substantial length of the second recess. Advantageously the at least one slot extends along a length of the second recess a distance sufficient to allow water to bypass the second, smaller diameter sealing ring on the smaller diameter, male cylindrical body during use.

Further, the leak indicator passageway may open onto the rim to form a slot. The leak indicator passageway may also have a closed periphery extending through the first wall. There may be a plurality of leak indicator passageways, and preferably they are symmetrically located about the first recess, with two, three and four such passageways being preferred. Depending on the location, a portion of the leak indicator passageways may extend through one of the flanges.

The location of the leak indicator passageway may be such that if first sealing ring has an undeformed diameter D, then the bottom of the leak indicator passageway at the first recess is located between a top of the first sealing ring during use, and a location 0.2 D below the top of the first sealing ring during use.

BRIEF DESCRIPTION OF THE DRAWINGS

These and other advantages of the invention will be better understood by reference to the following description and drawings, in which like numbers refer to like parts throughout, and in which.

DETAILED DESCRIPTION

Figure 1:
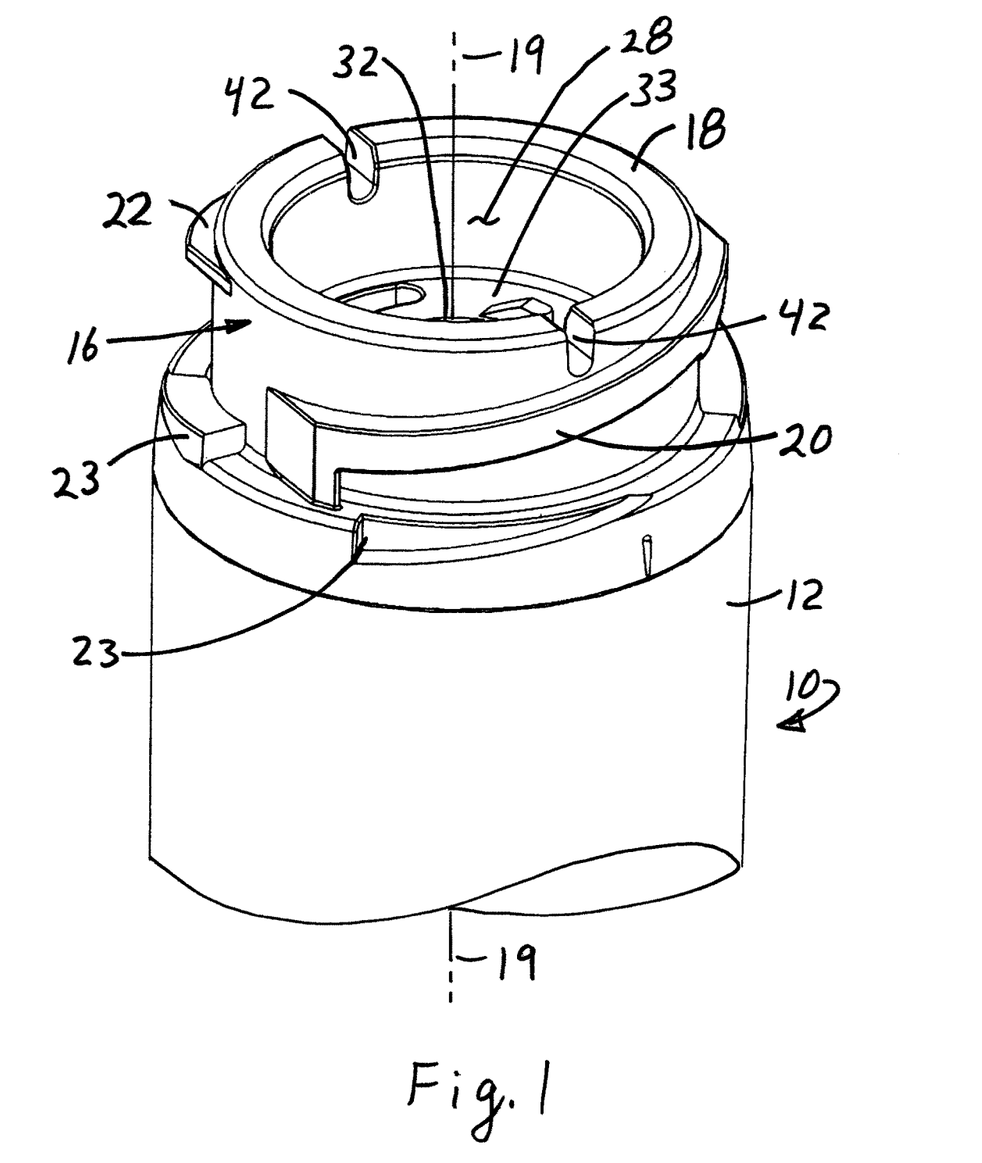
FIG. 1 is a top perspective view of a water filter cartridge having two leak indicator slots opening onto a rim of the filter cartridge.
Figure 2:
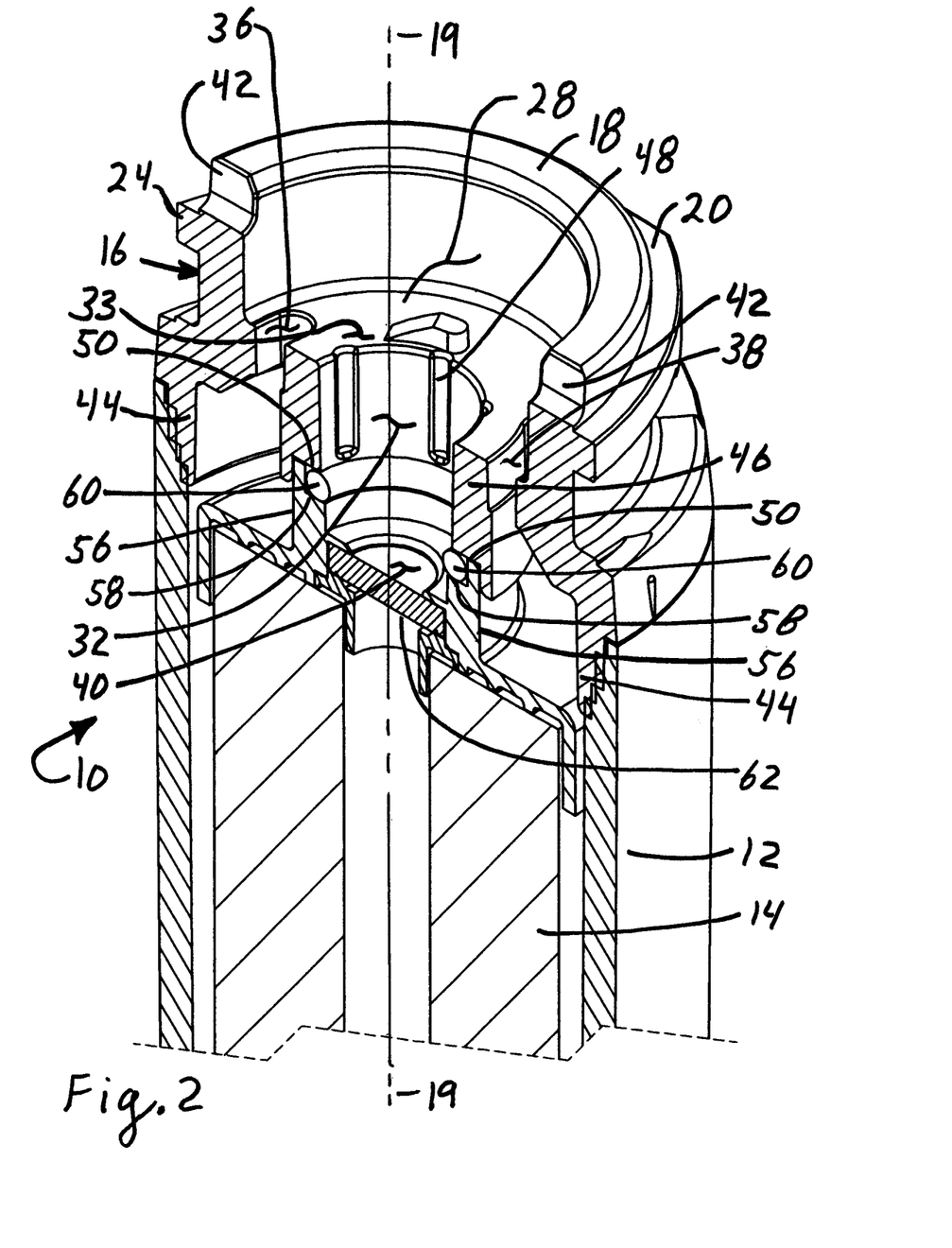
FIG. 2 is a partial sectional view of the filter cartridge of FIG. 1.
Figure 3:
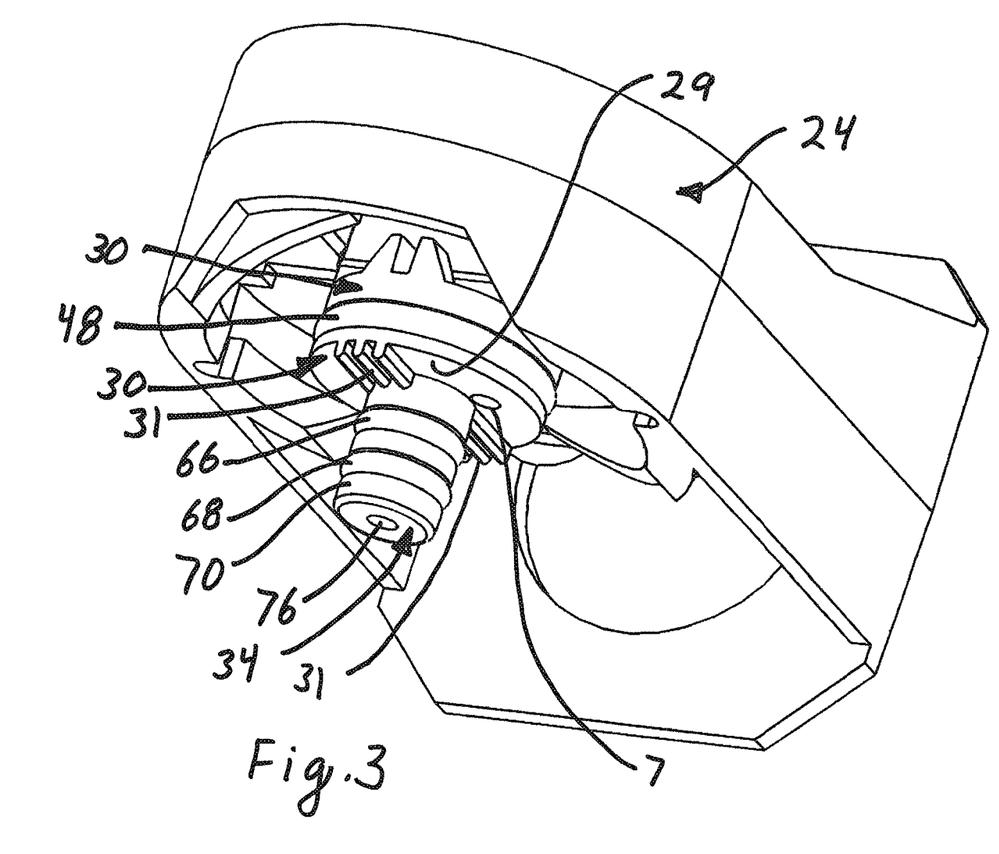
FIG. 3 is a bottom perspective view of a manifold with which the filter cartridges of this invention may be used.
Figure 4:
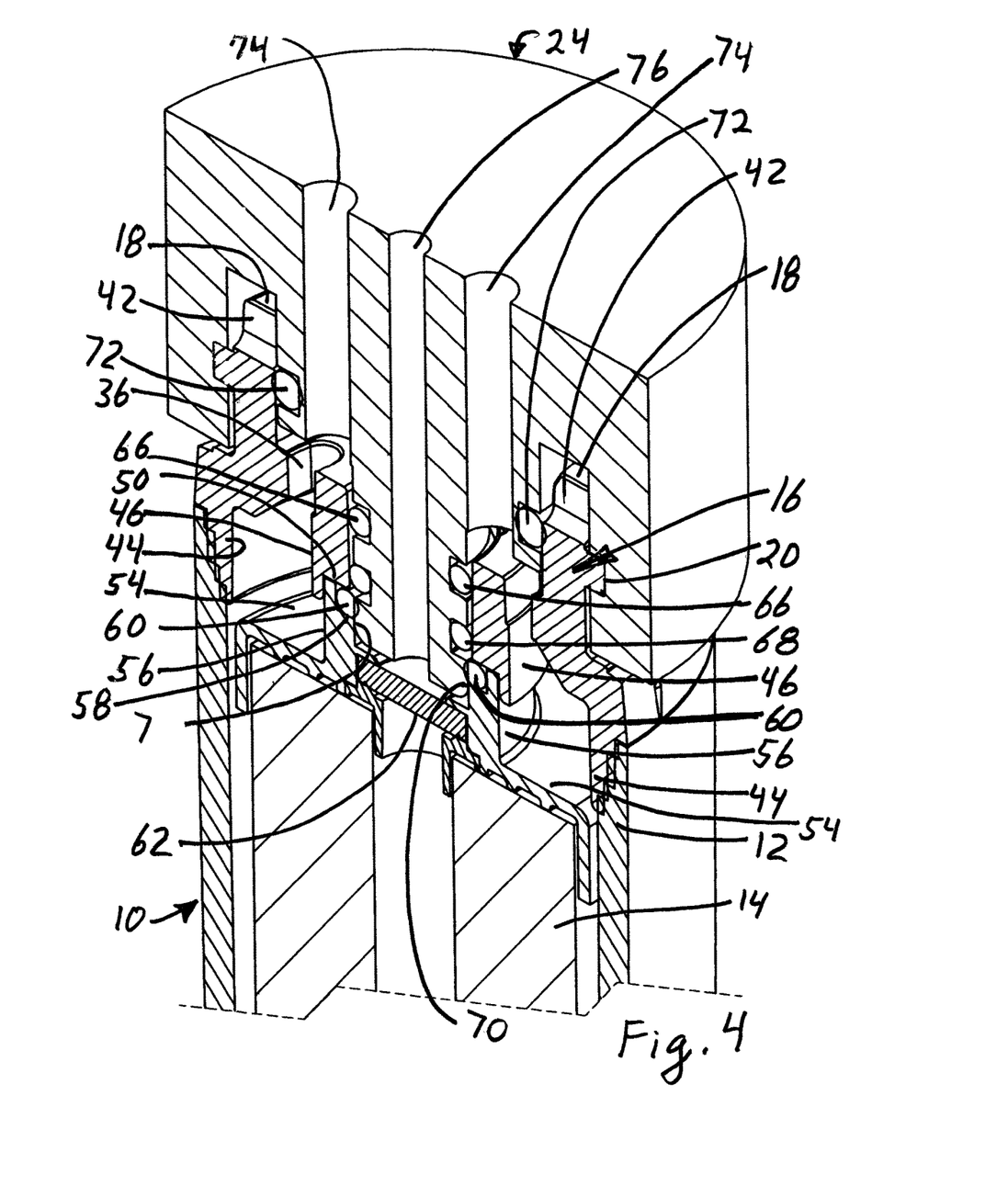
FIG. 4 is a top perspective view showing the filter cartridge of FIGS. 1-2 mating with the manifold of FIG. 3.

Referring to FIGS. 1-4, according to an embodiment of the present invention, a water filter cartridge 10 includes a cylindrical outer housing 12, a water filtration media 14 inside the housing 12, and a filter cap 16 affixed to an upper end of the housing 12 to thereby enclose the filtration media 14. The filtration media 14 may be granular activated carbon (GAC), granular bactericide and/or suitable fibrous filter media such as a pleated paper, or paper with carbon, solid tubular forms of media such as formed porous carbon blocks or other formed porous filtration media. The filter cap 16 has a circular rim 18 (FIG. 1) with a pair of flanges 20 and 22 on opposing sides of the filter cap for forming a bayonet lock by engaging mating portions of a manifold 24 (FIGS. 3-4). Rotation stops 23 may optionally be provided on the filter cap 16 or housing 12 to engage mating surfaces on the manifold 24 is as known in the art. The housing 12 and filter cap 16 are preferably molded of white ABS plastic.

The relative directions upwards, downwards, top and bottom are with respect to the orientation of the filter cartridge as shown in FIGS. 1-4 which assumes the longitudinal axis 19 of the filter cartridge is vertical. The relative directions inward, outward are with respect to longitudinal axis 19 which extends along the length of and through the center of the filter cartridge 10, with inward being toward that axis and outward being away from that axis.

The manifold 24 is similar to the manifold found in several models of current refrigerators, such as those that incorporate their own dedicated water filtration system, including filtrations systems described in U.S. Pat. No. 5,753,107 of Magnusson et al., the complete contents of which are hereby incorporated by reference. The flanges 20 and 22 and features on the manifold 24 form a bayonet lock mechanism. The flanges 20 and 22 firmly hold the filter cartridge 10 in an operative position when twisted and locked in the manifold 24. Collectively the filter cartridge 10 and the manifold 24 form a water filtration system.

The filter cap 16 has a first, upper portion with a first wall defining a first, larger diameter, female, cylindrical recess 28 (FIG. 1). The recess 28 is positioned between the flanges 20 and 22 and typically centered on a longitudinal axis of the filter cartridge 10 and manifold 24. The cylindrical recess 28 is sized to receive a larger diameter, male cylindrical body 30 (FIG. 3) of the manifold 24 during use. The larger diameter, cylindrical body 30 has a surface 29 extending generally radially from a longitudinal axis of the body 30, which coincides with the longitudinal axis 19 of the filter cartridge 10 during use. The surface 29 is perpendicular to or orthogonal to that longitudinal axis 19 and optionally has a one or a series of radially extending ridges 31 or other protrusions thereon.

The filter cap 16 further has a second portion below the first portion and defining a second, smaller diameter, cylindrical recess 32 (FIG. 1) concentric with the larger diameter, female cylindrical recess 28 and depending downwardly in an axial direction. Shoulder 33 extends between the bottom of the first, larger diameter recess 28 and the top of the second, smaller diameter, recess 30. The shoulder 33 is preferably orthogonal to longitudinal axis 19 and is also generally parallel to the manifold surface 29. The smaller diameter, cylindrical recess 32 is sized to receive a smaller diameter, male cylindrical body 34 (FIG. 3) of the manifold 24 during use.

The first, upper portion of the filter cap 16 that defines the larger diameter, cylindrical recess 28 has one or more diametrically spaced arcuate-shaped inlet ports, with two such inlet ports 36 and 38 (FIGS. 1, 2) positioned to allow the inflow of unfiltered water from the manifold 24 for passage through the filtration media 14. The second, lower portion of the filter cap 16 that defines the smaller diameter, cylindrical recess 32 has an outlet port 40 (FIG. 2) that is preferably circular and preferably centrally positioned on axis 19 to allow the outflow of filtered water to the manifold 24.

Figure 5:
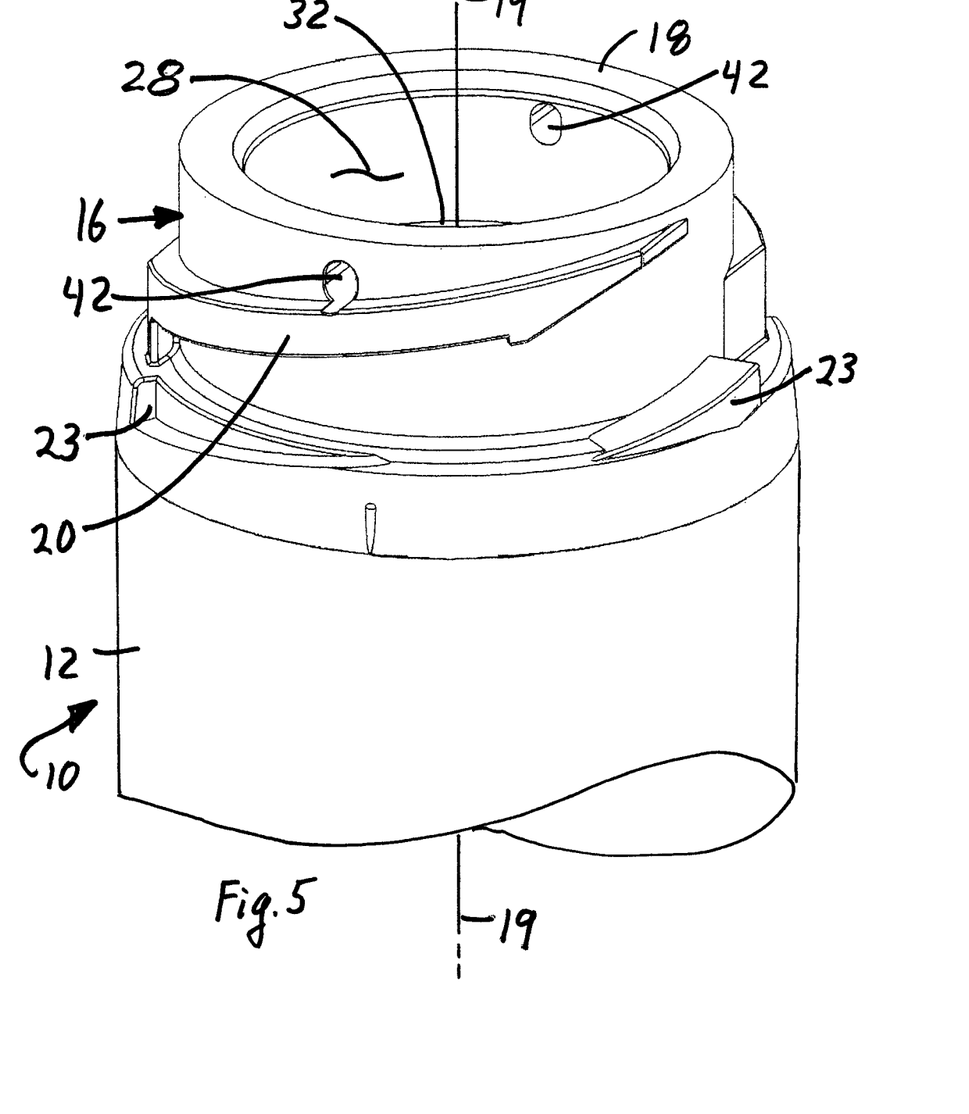
FIG. 5 is a top perspective view showing the water filter cartridge of FIG. 1 with the leak indicator not opening onto a top rim of the filter cartridge.

The first portion of the filter cap 16 that defines the larger diameter, cylindrical recess 28 has a leak indicator passageway 42 shown in the form of slot passageway 42 (FIGS. 1-2 and 4) having one closed end located towards the bottom of the recess 28 and an opposing end opening onto rim 18 of the first wall forming the cylindrical recess 28. The leak indicator passageway 42 is formed in and extends through the first wall defining the first, larger diameter, recess 28. The leak indicator slot passageway 42 extends toward but ends short of the shoulder 3 that forms the bottom of the recess 28, ending at a location described later relative to Manifold 24. The leak indicator passageway 42 forms a fluid passageway and when in the form of a slot has one open end and one closed end, with the closed end at least adjacent to the sealing ring 60 as described later and the top end opening onto the rim 18 of the filter cap 16. An alternative form of the indicator passageway 42 is shown in FIG. 5 in which the leak indicator passageway 42 forms a water passageway having ends opening onto opposing sides of the first wall forming large diameter recess 28 and has an otherwise closed periphery so that the leak indicator passageway does not open onto the top rim 17 of the filter cap 16.

Referring to FIGS. 2 and 4, the outer periphery of filter cap 16 has a depending flange 44 that is fastened to a top end of the housing 12. The fastened parts of flange 44 and housing 12 may be connected in various ways that provide a suitable, water tight seal, such as adhesives, sealed threads, spin welding or other melting connections, or other water tight connections. The filter cap 16 has a depending second wall 46 forming the second, smaller diameter recess 32, with the depending wall 46 depending from the bottom 33 of the larger diameter recess 28. A plurality of optional slots 48 may optionally be formed in the inward facing surface of the depending wall 46 that forms the smaller diameter recess 18. The slots 48 are longitudinal, parallel to axis 19 and have an upper end opening onto the bottom 33 and larger diameter recess 28. The slots have a lower end that is preferably closed, terminating adjacent to but offset from a lower end of the depending inner wall 46. The slots 48 are preferably equally spaced, with from four to six slots believed suitable. The slots 48 preferably extend for a substantial length (i.e., more than half) of the second, smaller diameter recess 32, and preferably extend for about ¾ or more of the length of the recess 32 as measured relative to axis 19. The recess 32 is thus preferably generally cylindrical with longitudinal slots 43 extending along a length of the surface. The depending second wall 46 thus forms the second, smaller diameter cavity 18, preferably having an inward facing, cylindrical surface with longitudinal slots 48 spaced at regular intervals around that surface to define the cavity 18. The slots 48 form a bypass recess allowing water to bypass sealing rings on body 34 during use, as discussed later. The specific number and shape of the slots or other shapes forming the bypass recess may vary. The bottom end of the depending inner wall 46 advantageously contains an annular recess or notch 50 facing longitudinal axis 19 and opening downward. This notch 50 forms part of the recess containing the sealing ring.

The filter media 14 advantageously comprises a tubular, cylindrical filter having an end cap 54 that helps separate the unfiltered and unfiltered water. The end cap 54 is shown as having a flange that connects to one end of the tubular filter 14 so as to force water to flow back through the filter 14. An annular boss 56 extends upward from the end cap 54 and is centered on longitudinal axis 19. The upper edge of the annular boss 56 has a notch 56 which cooperates with notch 50 to form a recess containing a sealing ring 60. The sealing ring 60 is preferably an O-ring but other cross-sectional shapes could be used. The an annular sealing ring 60 is placed in a groove that is preferably formed at least partially by the second, depending wall 46 forming the second recess 32, via notch 50. The annular sealing ring 60 is placed in a groove that is also preferably formed at least partially by the end cap 54 of the filter cartridge 10.

When the filter cap 16 is fastened to the housing 12, the lower end of the second wall or inner wall 46 cooperates with the upper end of the annular boss 56 to form a recess for sealing ring 60. Advantageously, the notches 50, 58 mate with each other to connect the end piece 54 to the second wall 46 and form the groove containing sealing ring 60. The groove formed by annular notches 50, 58 preferably has a few thousandths of an inch of clearance between the sealing ring 60 and the inside of the recess, with the ring 60 deforming during use to provide a water tight seal between the mating parts forming the groove in which the sealing ring 60 is placed. Preferably, the upward facing notch 58 has one wall orthogonal to axis 19 and one wall encircling that axis, while the downward facing notch 50 has one wall orthogonal to axis 19 and one wall encircling that axis but smaller in diameter than the encircling wall of notch 58, so that notch 50 fits inside notch 58 to enclose the sealing ring 60 between the notches without squeezing the seal 60, but alternatively slightly squeezing the seal 60, say less than about 5% change in dimension. The notches 50, 58 preferably form a recess slightly larger than the cross-section of the sealing ring 60 to avoid damaging the sealing ring if the filter cap 16 is fastened to the housing 12 by spin welding, as rotation of the wall 46 could damage the sealing ring 60. Thus, during use the sealing ring 60 preferably provides a water tight seal to prevent water from leaking between the juncture of boss 56 on end cap 56, and the annular wall 46 on filter cap 16, and alternatively, when manufactured such a watertight seal is provided.

Still referring to FIGS. 1 and 4, the fines filter 62 preferably but optionally extends across the water passage at the upper end of the filter housing and is preferably located at the base of the annular boss 56. The fines filter 62 may comprises a piece of felt, a fine mesh screen, an ABS plastic frit or frit of other material, or other porous material suitable for filtering out small particles or fines of carbon or other particles generated by the filter media 14. The fines filter 62 may be held in place by forming an inwardly extending flange on the inside wall of the annular boss 56 in order to stop the filter from moving past that inwardly extending flange. After the fines filter 62 is positioned against the inwardly extending flange on the boss 56, a locking ring or mounting disc may be inserted to retain retains the filter 62. The mounting disc is shown as having a central tubular portion that inserts into a cylindrical recess or notch formed in the bottom of the end cap and encircling the outward fluid passage.

Referring to FIGS. 3 and 4, the manifold includes the larger diameter and smaller diameter male bodies 30, 34 which are coaxial and extend along axis 19 during use. One or more O-rings 66 and 68 are seated in corresponding exterior annular grooves in the smaller diameter, male cylindrical body 34 of the manifold 24. The most distal sealing ring 68 on the smaller diameter male projection 34 is not at the actual distal end of the male projection 34 or located in a downward facing notch, as a cylindrical tip 70 separates the distal end of projection 34 from the adjacent sealing ring 68. A single O-ring 72 is located in a corresponding groove in the larger diameter, male cylindrical body 30.

The manifold 24 also includes an inlet port 75 is in fluid communication with one of the inlet ports 36 and 38 of the filter cartridge 10. An outlet port 87 extends through the manifold 24 and receives filtered water passing through the outlet port 40 of the filter cap 16 on filter cartridge 10. The manifold 24 thus has water inlet port(s) 75 for receiving unfiltered water and providing it to the filter cartridge 10, and has an outlet port 76 for receiving filtered water from the cartridge 10 and passing that water to the appliance or user of the appliance desiring filtered water.

Because the manifold 24 is made for installation in a large number of appliances and because the filter cartridge 10 must be replaced on each of these appliances many times, the manifold is made with great accuracy so the parts are always of the same dimension. Thus, the location of the sealing rings 66, 68 and 72 are always the same in each manifold 24. In particular, when the flanges 20, 22 engage mating surfaces in the manifold 24 and the filter cartridge is rotated into its operating, use position, the tip 70 abuts the sealing ring 60 and compresses it to form a water tight seal. In that use position, sealing ring 72 abuts against the inner surface of the first wall forming the first, larger diameter recess to form a water tight seal. In that use position, sealing rings 66, 68 abut the cylindrical wall of the second, smaller diameter recess to form a fluid tight seal, but the longitudinal slots 48 allow water to bypass those sealing rings 66, 68 by flowing through one or more, and preferably all of the slots 48. The sealing ring 60 is thus consistently positioned to seal against the side of the distal tip 70 of the smaller diameter, male projection 34, and the sealing ring 72 is consistently positioned to seal against the larger diameter recess 28 at a predetermined location. It is believed possible for the sealing ring 60 to abut other portions of the smaller diameter, male body 34 and form a suitable water tight seal.

The location of the leak indicator passageways 42 are selected to position the bottom of the passageways 42 at a desired location relative to the sealing ring 60 during use, as discussed herein. The bottom of the leak indicator passageway 42 could be located immediately adjacent the sealing ring 72, and as used herein that means between a location a few thousandths of an inch above the midpoint of the sealing ring 72 to about 0.1 inches above the top of the sealing ring 72, but that range of distances is not preferred as the first risks causing the sealing ring 72 to leak and the second delays detection of small leaks. The, preferred distances depend on the sealing ring 72, which is preferably an O-ring seal, such that if the top of the sealing ring 72 with un-deformed diameter D before mating with the filter cap 16 is located a distance X below the top of the rim 18 above the passageway 42 during use of the filter cartridge 10, or located a distance Y above the bottom 33 during use, then the bottom of the leak indicator passageway 42 as it opens onto the recess 28 is located a distance of about X to about X+0.2 D below the rim 18, and preferably located a distance of about Y to about Y−0.2 D above the bottom or shoulder 33. Thus, the bottom of the leak indicator passageway 42 at the first recess 28 is located between a top of the first sealing ring 72 during use, and a location 0.2 D below the top of that first sealing ring 72 during use, using the undeformed diameter D of the sealing ring to determine the specified distances.

The above preferred location of the bottom of the leak indicator passageway allows even small leaks to be detected. For larger leaks, it is believed suitable to have the bottom of the leak indicator passageway located between a top portion of the sealing ring 72 and the top rim 18 of the wall forming the recess 28.

Referring to FIGS. 4-5, during use, the sealing ring 72 on the larger diameter male projection of the manifold mates with the larger diameter recess 28 to prevent unfiltered water from the manifold inlet 75 from leaking out of the manifold 24 if there is an improper connection with the filter cartridge 10. The leak indicator passageway 42 is positioned to detect leaks past this sealing ring 72. When the cartridge 10 is installed into its operative position in the manifold 24 the O-ring 72 is squeezed between the inward facing, first, cylindrical wall of the larger diameter recess 28 and the outward facing, larger diameter male projection 30. As the O-ring seal 72 blocks flow of water into the water filter cartridge 10, any water leaking past the seal 72 will flow out the leak indicator passageway 42. Because the rim 18 of the filter cap 16 is in a dead-end recess in the manifold 24, any leaking water will flow from the leak indicator passageway 42 toward the bayonet mounting flanges 20, 22 and out the manifold where it will be visible.

In its normal operating position the O-ring 72 is positioned to prevent water from otherwise flowing through the leak indicator passageway 42 and externally of the manifold and eventually on to the kitchen floor. When under normal water pressure, the water filtration system is expected to immediately visually exhibit a substantial leak if the filter cartridge 10 is coupled to the manifold 24 of the water filtration system in the operative position without the O-ring 72 being correctly positioned and engaged to form a water tight seal. The leak indicator passageway 42 will direct water leaking past first sealing ring 72 through the first wall of the filter cap 16 so that leaking water may exit the filter cap and be visually detected. The location of the leak indicator passageway 42 relative to the sealing ring 72 thus provides a means to direct leaking water from the inside of the filter cap 16 to the outside of the filter cap.

Because the present design positions the leak indicator passageway 42 adjacent the larger diameter sealing ring 72, the location of the leak indicator passageway 42 may be much closer to the rim 18 than prior art designs that added and relied upon an added ring being located at the bottom of the larger diameter recess 28, adjacent bottom 33. That reduces the longitudinal length of the slot in the direction of axis 19 and the shorter length increases the strength of the first wall forming the recess 28, when the leak indicator passageway 42 takes the form of a slot.

By locating the bottom end of the leak indicator passageway 42 at the described location immediately adjacent the O-ring seal 72, it is believed that a small volume of water leaking past seal 72 will more readily pass through the leak indicator passageway 42, allowing smaller sized leaks to be detected, or at least detected faster. It is further believed that the volume of leaking water need not fill the entire passageway formed by the leak indicator passageway 42 and need not fill the entire gap between the sealing ring 72 and the bottom of the leak indicator passageway 42. It is believed that the O-ring abutting against the first wall forming the recess 28, even when the O-ring is deformed, will create a capillary action or guide channel to direct even small volumes of water toward the leak indicator if the sealing ring 72 is horizontal. If not horizontal, the leak indicator passageway 42 or a plurality of leak indicators should be provided so that gravity helps direct any leaked water along the sealing ring 72 toward and through the leak indicator passageway 42. A leak indicator passageway 42 having a continuous passageway (uninterrupted by cavities or recesses) from the larger diameter recess 28 to the detection location, is preferred. But even small cavities are believed not to affect the basic functioning of the leak detection ability. There is thus provided a water filter configuration using a leak indicator to more readily allow the detection of leaks when a water filter cartridge is installed in a manifold.

The O-rings 66, 68 on the smaller diameter male projection 34 fit into and mate with the second wall or cylindrical inner wall of the smaller diameter recess 32. The sealing rings 66, 68 normally form a water tight fit with the abutting second wall of the smaller diameter recess 32. But optionally, the sealing rings 66, 68 do not form a water tight seal with the wall of recess 32 because the longitudinal slots 48 pass over each of sealing rings 66, 68 and allow water to flow along axis 19, past both sealing rings 66, 68. If the slots 48 are present, a conventional water tight fit is provided. But if the slots 48 are present, the slots 48 bypass the seal normally formed by sealing rings 66, 68 and the wall of the smaller diameter recess 32.

To provide a water tight seal and control water flow through the filter, the sealing ring 60 is deformed by the tip 70 of the smaller diameter male projection 34 to seal against that tip 70, preferably adjacent the groove containing sealing ring 68 and more preferably with the bottom edge of the groove retaining seal 70 overlapping with a top of the seal 60. Insertion of the smaller diameter male projection 34 into the smaller diameter recess 32 thus causes tip 70 of the smaller male projection 34 to deform sealing ring 60 and prevent water from flowing between the notches 50 either longitudinally or radially. That insertion of smaller diameter, male projection 34 also allows water to flow past sealing rings 66, 68 so that the water from inlet 56 is on one side of sealing ring 60 while water from outlet 68 is on the other side of sealing ring 60.

Because the inlet water pressure is greater than the outlet water pressure, the water pressure on the sealing ring 60 on the upstream, inlet side is expected to exceed the downstream pressure so that any pressure differential will push the sealing ring 60 against the distal tip 70 of the smaller diameter male projection 34 of the manifold 24, and that is believed to increase sealing and help prevent leakage across sealing ring 60. If water flows the other direction past sealing ring 60, filtered water is merely added to the upstream flow and the leaked water will be filtered a second time. Thus, the pressure differentials in an operating water filter are expected to help sealing ring 60 maintain a water tight seal.

Referring to FIG. 5, the leak indicator passageway 42 is shown as an enclosed passageway having a periphery contained entirely within the first wall through which the passageway extends, rather than having one portion of the passageway open onto the upper rim 18 as in the slot of FIGS. 1-5. This enclosed passageway has a first end opening on the inner surface of recess 28 facing the larger diameter, male projection 20, with the bottom of the passageway located as described previously regarding the leak indicator passageway 42 in the form of the U-shaped slot. The second, opposing end of the closed passageway forming the leak indicator passageway 42 opens onto an opposing side of the first wall defining the recess 28, and opens onto an exterior surface of the filter cap 16.

The passageway 42 is shown as being located near the top of the filter cap 16, just below the rim 18, with the passageway intersecting and extending through a top portion of the flanges 20 (shown), 22 (not shown). Depending on the number and location of the passageways 42, one or more of the passageways may or may not pass through at least a portion of the bayonet flanges 20, 22. The passageway 42 may have various cross-sectional shapes, with an oval shape having short but parallel sides joining rounded ends being depicted. The cross-sectional shapes could be circular or polygon in shape, including square, rectangular or triangular. Rounded sides are preferred to reduce stress concentrations and make molding easier, but straight sides with rounded junctures are believed suitable. The size of the cross-sectional shapes could also vary. Smaller sizes may allow water to flow through faster and may allow the detection of smaller leaks faster. The passageways 42 are preferably radially oriented to reduce its path length. But the passageway 42 could be non-radial, curved, non-planar, tortuous, or combinations thereof. If the passageway 42 opens onto the outer rim 18, the passageway becomes the slot of FIGS. 1-5. Thus, the leak indicator passageway 42 refers to both passageways having a cross-section that opens onto an edge of the cap 16, and passageways having a cross-section that is completely enclosed by the first wall of the filter cap 16 through which the passageway 42 extends.

If water leaks past the ring seal 72, the water may flow into leak indicator passageway 42 which is immediately adjacent that ring seal 72. Advantageously, O-ring seal 72 has a top side adjacent the bottom of the leak indicator passageway 42, and preferably the bottom of the leak indicator passageway 42 overlaps with about the top 20% of the longitudinal height of the O-ring seal 72. As the cartridge is installed in the manifold 24, the O-ring seal 72 is squeezed and deforms slightly and bottom of the indicator slot passageway 42 may exceed the top 20% measurement but the leak indicator passageway 42 does not extend far enough along the deformed and sealed O-ring 72 as to destroy the seal and allow leakage. In theory the leak indicator passageway 42 could extend to or slightly above the centerline of the O-ring seal 72 in its un-compressed condition but the bottom of the leak indicator passageway 42 is preferably located slightly above the centerline of the O-ring seal passageway 42 (toward the manifold) in its compressed, sealing position that arises during use, and more preferably is within the top 20% of the height of that sealing ring passageway 42 in the uncompressed state. The bottom of the leak indicator could be slightly above the top of the O-ring seal 72 in its uncompressed or compressed state but that may require more water to leak before being detected.

The slot passageway 42 opens upwardly and extends in a generally radial direction through the first wall that defines the first portion of the filter cap 16 that defines the larger diameter, cylindrical recess 28. The circular rim 18 may be a continuous material as shown, for increased strength. The rim 18 and first wall defining the recess 28 may be formed of two or more concentric walls in which event the leak indicator passageway 42 preferably extends through such two or more walls. There may be one or more leak indicators.

As shown in FIGS. 1-4, the leak indicator is a slot with a closed end or bottom of the leak indicator passageway 42 being adjacent the sealing ring 72, and with the slot having an opposing open end that opens onto the upward facing end of the rim 18. The leak indicator passageway 42, shown as a slot, is preferably radially oriented to reduce its path length. But the leak indicator passageway 42 could be non-radial, curved, non-planar, tortuous, or combinations thereof. The leak indicator passageway 42 in the form of a slot may include various cross-sectional shapes for the slot, including the U-shaped cross-section as shown. The cross-sectional shapes could be curved, or polygon in shape. Rounded bottoms on the slots are preferred in order to reduce stress concentrations and make molding easier, but straight sides with smaller diameter, rounded junctures are believed suitable. The size of the cross-sectional shapes of the slot could also vary. Smaller sizes may allow water to flow through faster and may allow the detection of smaller leaks faster. U shaped slots are preferred when the leak indicator passageway 42 comprises a slot, with the bottom of the U forming the closed end of the slot and being closest to the sealing ring 72. A leak indicator passageway 42 comprising a closed passage is described later regard FIG. 5.

The sealing members, especially sealing member 60, preferably take the form of a deformable O-ring having a circular or round cross-section and is of a suitable deformable elastomeric material such a butadiene. Other forms of deformable annular sealing members can be used such as D-seals, quad seals and flexible washers. In addition, compressible sealing members in the form gaskets could be utilized.

There is thus provided a water filter cartridge 10 for refrigerators and other appliances that is configured to indicate leakage when a cartridge is installed in a manifold having a larger diameter, male inlet and a smaller diameter, coaxial, male outlet. The filter cap 16 has a cylindrical recess 28 that mates with an O-ring 72 on the manifold inlet 29 during use. A fluid passageway 42 extends through the wall forming that recess 28 and opens immediately adjacent that O-ring 72 to carry any leaking water to the outside of the filter cap 16. The filter cap has a sealing ring 60 on a smaller diameter recess 32 that mates with the sidewall 70 of the male inlet 34 at a distal end thereof. The smaller diameter recess 32 may have slots 48 that allow water to bypass seals 66, 68 on the male outlet member 34. Under normal water pressure the system will immediately visually exhibit a substantial leak if the filter cartridge is incorrectly coupled to the manifold.

Figure 6:
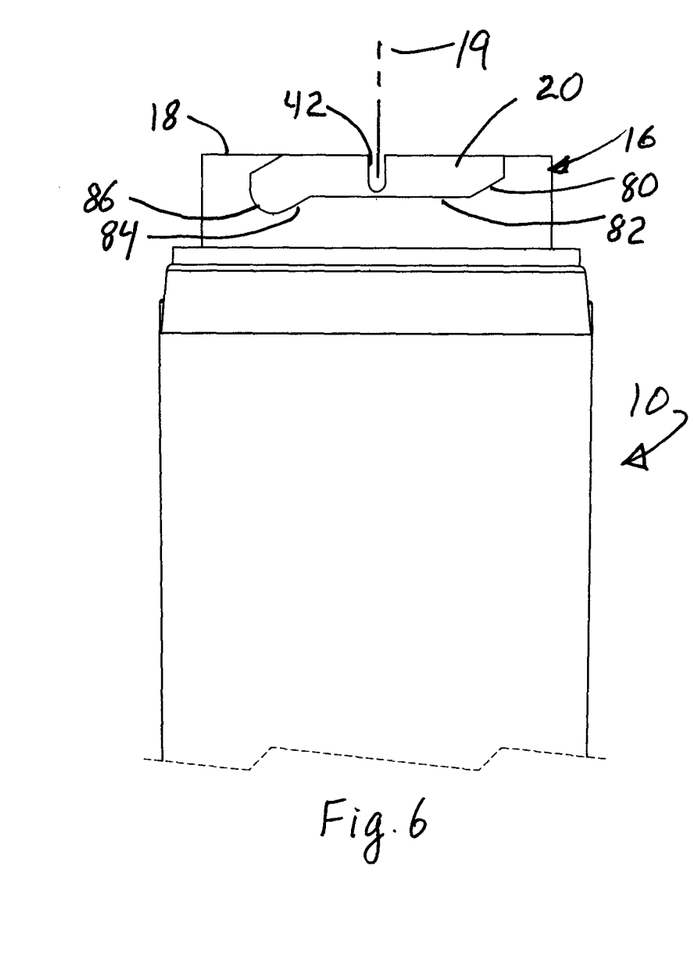
FIG. 6 is a side view of the filter cartridge with a different flange.

Referring to FIG. 6, the flange 20 on cap 16 may take diverse forms depending on the nature of the mating lugs on the manifold with which the flange 20 mates to hold the filter cartridge 10 in position in the manifold. One advantageous configuration of the locking lug or flange 20 on the cartridge is shown in which the leading edge of the flange 20 has an inclined surface 80 to make it easier for the flange to ramp onto a mating ledge or flange in the manifold. The inclined surface leads to a trailing, horizontal portion 82 which rests on the internal flange within the manifold during use of the filter cartridge 10 in order to lock the cartridge into position during use. As used herein, the leading edge refers to the edge that advances or leads when the cartridge 10 is rotated into its installation position. The trailing end is opposite the leading end. An inclined surface 24 at the trailing end of the flange 20 provides a position stop or rotation stop to resist over-rotation of the cartridge during installation, with inclined surface 84 preferably having the same inclination angle as surface 80. The trailing end of the inclined surface 84 preferably ends in a rounded end 86. The flange 20 extends outward from the cap 16, preferably extending radially outward a distance sufficient to engage the mating part in the manifold during use. The leak indicator slot 42 extends through the cap 16 and the flange 20 if the slot is located so as to coincide with the flange. Advantageously, the slot 42 is located to extend through the flange 20 along the horizontal portion 82.

Figure 7:
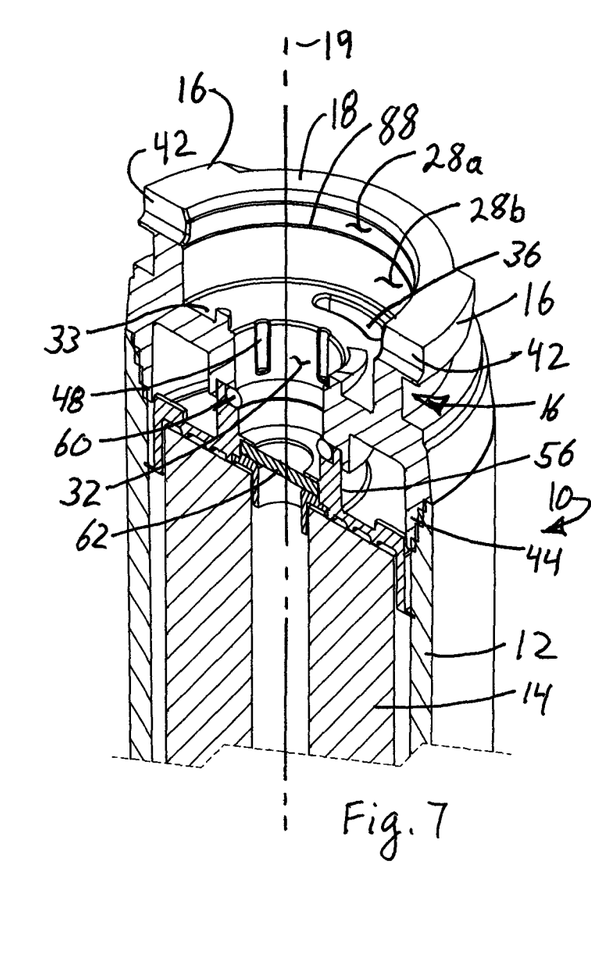
FIG. 7 is a partial sectional view of the filter cartridge of FIG. 1 showing a stepped recess in the first, female cavity in the cap.

Referring to FIG. 7, the first female cavity 28 is shown as a stepped recess having a first, larger diameter portion 28a adjacent the rime 18 and extending along the length of the slot 42, and a second, smaller larger diameter portion 28b extending from the bottom of slot 42 to the shoulder 33. A slight shoulder 88 extending between the first and second portions 28a, 28b. The recess having an interior portion. The shoulder 88 is located at the bottom of the leak indicator passage 42, shown in the figures as a U-shaped slot opening onto rim 18. The shoulder preferably, but optionally, is located to allow seal 72 (FIG. 4) to abut and seal against the wall forming smaller diameter cavity 28b. The first, larger diameter cavity 28a may have a chamfer adjacent the rim 18. The shoulder 88 may have a radial length from about 0.005 inches to 0.02 inches.

As seen in FIG. 4, the manifold seal 72 may about what corresponds to wall 28b while the larger diameter cylindrical cavity 28a is large enough that the seal 72 does not abut the wall forming cavity 28a. The larger cavity 28a provides an annular space between the wall forming the cavity 28a and the manifold body 30 that can allow pressure to escape the cavity 28 as the seal 72 is inserted into and removed from engagement with the wall forming the smaller diameter cavity 28b. The annular space also directs the escaping pressure into the manifold 24 (FIGS. 3, 4) rather than out through the slot 42.

While several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A water filter cartridge, comprising:
an outer housing;
a water filtration media inside the housing;
a filter cap affixed to an end of the housing to thereby enclose the filtration media, the filter cap having a rim with a pair of flanges for engaging a manifold of a water filtration system to hold the filter cartridge in an operative position when twisted in the manifold, the filter cap having a first portion with a first wall defining a first, cylindrical female recess positioned between the flanges and sized to receive and form a water-tight seal with a first sealing ring encircling a first, cylindrical male body of the manifold during use, the filter cap having a second portion with a second wall defining a second cylindrical recess concentric to the first female recess and having a smaller diameter than the first cylindrical recess and depending in an axial direction, the second recess being sized to receive during use a second male cylindrical body of the manifold having a smaller diameter than the first, cylindrical male body and having at least one second sealing ring encircling the second male cylindrical body, the first portion of the filter cap that defines the first cylindrical recess having an inlet port positioned to allow the inflow of unfiltered water from the manifold for passage through the filtration media, the second portion of the filter cap that defines the second recess having an outlet port positioned to allow the outflow of filtered water to the manifold; and a leak indicator passageway extending through the first wall with the bottom of the passageway at the first, cylindrical recess being located a predetermined distance from the top rim of the first wall which distance is selected to place the bottom of the passageway immediately adjacent the first sealing ring during use;

whereby when under normal water pressure the leak indicator passageway will visually exhibit a leak if the filter cartridge is coupled to the manifold of the water filtration system in the operative position without the first sealing member being positioned in the larger diameter, cylindrical recess to form a water tight seal.

2. The water filter cartridge of claim 1, further comprising at least one sealing ring located in a groove formed at least partially in the second recess and encircling the second recess.

3. The water filter cartridge of claim 1, further comprising at least one sealing ring located in a groove formed at least partially in an end cap of the filter and encircling the second recess, the end cap being connected to the second wall.

4. The water filter cartridge of claim 1, further comprising at least one slot extending along a substantial length of the second recess.

5. The water filter cartridge of claim 2, further comprising at least one slot extending along a substantial length of the second recess.

6. The water filter cartridge of claim 3, further comprising at least one slot extending along a substantial length of the second recess.

7. The water filter cartridge of claim 1, further comprising at least one bypass recess extending along a length of the second recess a distance sufficient to allow water to bypass all sealing rings encircling the second, smaller diameter, male projection during use.

8. The water filter cartridge of claim 2, further comprising at least bypass recess extending along a length of the second recess a distance sufficient to allow water to bypass all sealing rings encircling the second, smaller diameter, male projection during use.

9. The water filter cartridge of claim 3, further comprising at least one bypass recess extending along a length of the second recess a distance sufficient to allow water to bypass all sealing rings encircling the second, smaller diameter, male projection during use.

10. The water filter cartridge of claim 1, wherein the leak indicator passageway opens onto the rim to form a slot.

11. The water filter cartridge of claim 2, wherein the leak indicator passageway opens onto the rim to form a slot.

12. The water filter cartridge of claim 1 wherein the leak indicator passageway has a closed periphery extending through the first wall with one end opening onto the first recess and the opposing end opening onto an exterior of the filter cap.

13. The water filter cartridge of claim 2, wherein the leak indicator passageway has a closed periphery extending through the first wall with one end opening onto the first recess and the opposing end opening onto an exterior of the filter cap.

14. The water filter cartridge of claim 1, wherein there is a plurality of leak indicator passageways as defined in claim 1.

15. The water filter cartridge of claim 2, wherein there is a plurality of leak indicator passageways as defined in claim 1.

16. The water filter cartridge of claim 1, wherein a portion of the leak indicator passageway extends through one of the flanges.

17. The water filter cartridge of claim 1, wherein the first sealing ring has an undeformed diameter D and wherein the bottom of the leak indicator passageway at the first, cylindrical recess is located between a top of the first sealing ring during use, and a location 0.2 D below the top of the first sealing ring during use.

18. The water filter cartridge of claim 2, wherein the first sealing ring is an O-ring having an undeformed diameter D and wherein the bottom of the leak indicator passageway at the first, cylindrical recess is located between a top of the first sealing ring during use, and a location 0.2 D below the top of the first sealing ring during use.

19. The water filter cartridge of claim 1, wherein the first sealing ring is an O-ring having an undeformed diameter D and wherein the bottom of the leak indicator passageway at the first, cylindrical recess is located between a top of the first sealing ring during use, and a location 0.2 D below the top of the first sealing ring during use.

20. The water filter cartridge of claim 2, wherein the first sealing ring is an O-ring having an undeformed diameter D and wherein the bottom of the leak indicator passageway at the first, cylindrical recess is located between a top of the first sealing ring during use, and a location 0.2 D below the top of the first sealing ring during use.

21. A water filter cartridge adapted to mate with a manifold of a water filtration system to hold the filter cartridge in an operative position when twisted about a longitudinal axis of the manifold and filter cartridge to engage the manifold, the manifold having a larger diameter, male, cylindrical body encircled by a first, larger diameter sealing ring, the manifold having a smaller diameter, male cylindrical body encircled by a second, smaller diameter sealing ring, the smaller diameter, male cylindrical body extending axially from a center of the larger diameter, male cylindrical body, the manifold having a first portion of a bayonet lock for holding the cartridge in the operative position, the larger and smaller diameter male, cylindrical bodies extending along the longitudinal axis, the water filter cartridge comprising:

an outer housing;

a water filtration media inside the housing;

a filter cap affixed to an end of the housing to thereby enclose the filtration media, the filter cap having a rim with a second portion of the bayonet lock, the filter cap having a first wall defining a larger diameter, female cylindrical recess positioned between the flanges and sized to receive during use the larger diameter, male cylindrical body of the manifold and form a water tight seal with the first sealing ring, the filter cap having a second wall defining a smaller diameter, cylindrical recess concentric with the larger diameter, female cylindrical recess and depending in an axial direction, the smaller diameter, cylindrical recess being sized to receive the smaller diameter, male cylindrical body of the manifold during use, the first portion of the filter cap that defines the larger diameter, cylindrical recess having an inlet port positioned to allow the inflow of unfiltered water from the manifold for passage through the filtration media, the second portion of the filter cap that defines the smaller diameter, cylindrical recess having an outlet port positioned to allow the outflow of filtered water to the manifold; and the first wall having a leak indicator passageway that has a first end in fluid communication with the first recess and a second end in fluid communication with an exterior of the filter cap, the leak indicator passageway having a bottom at the opening to the first recess which bottom is at a predetermined location that is immediately adjacent the first seal during use of the filter cartridge.

22. The water filter cartridge of claim 21, further comprising at least one sealing ring located in a groove formed at least partially in the second recess and encircling the second recess and longitudinal axis.

23. The water filter cartridge of claim 21, further comprising at least one sealing ring located in a groove formed at least partially in an end cap of the filter and encircling the longitudinal axis, the end cap being connected to the second wall.

24. The water filter cartridge of claim 21, further comprising at least one slot extending along a substantial length of the second recess.

25. The water filter cartridge of claim 22, further comprising at least one slot extending along a substantial length of the second recess.

26. The water filter cartridge of claim 23, further comprising at least one slot extending along a substantial length of the second recess.

27. The water filter cartridge of claim 21, further comprising at least one slot extending along a length of the second recess a distance sufficient to allow water to bypass the second, smaller diameter sealing ring on the smaller diameter, male cylindrical body during use.

28. The water filter cartridge of claim 22, further comprising at least one slot extending along a length of the second recess a distance sufficient to allow water to bypass the second, smaller diameter sealing ring on the smaller diameter, male cylindrical body during use.

29. The water filter cartridge of claim 23, further comprising at least one slot extending along a length of the second recess a distance sufficient to allow water to bypass the second, smaller diameter sealing ring on the smaller diameter, male cylindrical body during use.

30. The water filter cartridge of claim 21, wherein the leak indicator passageway opens onto the rim to form a slot.

31. The water filter cartridge of claim 22, wherein the leak indicator passageway opens onto the rim to form a slot.

32. The water filter cartridge of claim 21 wherein the leak indicator passageway has a closed periphery extending through the first wall.

33. The water filter cartridge of claim 22, wherein the leak indicator passageway has a closed periphery extending through the first wall.

34. The water filter cartridge of claim 21, wherein there is a plurality of leak indicator passageways as defined in claim 21.

35. The water filter cartridge of claim 22, wherein there is a plurality of leak indicator passageways as defined in claim 21.

36. The water filter cartridge of claim 21, wherein a portion of the leak indicator passageway extends through one of the flanges.

37. The water filter cartridge of claim 21, wherein the first sealing ring has an undeformed diameter D and wherein the bottom of the leak indicator passageway at the first recess is located between a top of the first sealing ring during use, and a location 0.2 D below the top of the first sealing ring during use.

38. The water filter cartridge of claim 22, wherein the first sealing ring is an O-ring having an undeformed diameter D and wherein the bottom of the leak indicator passageway at the first recess is located between a top of the first sealing ring during use, and a location 0.2 D below the top of the first sealing ring during use.

39. The water filter cartridge of claim 21, wherein the first sealing ring is an O-ring having an undeformed diameter D and wherein the bottom of the leak indicator passageway at the first recess is located between a top of the first sealing ring during use, and a location 0.2 D below the top of the first sealing ring during use.

40. The water filter cartridge of claim 22, wherein the first sealing ring is an O-ring having an undeformed diameter D and wherein the bottom of the leak indicator passageway at the first recess is located between a top of the first sealing ring during use, and a location 0.2 D below the top of the first sealing ring during use.

41. A water filter cartridge for use with a manifold of a water filtration system, the manifold having a smaller diameter male outlet fitting that extends coaxially from a larger diameter, male inlet fitting, a first sealing ring encircling the inlet fitting, a second and third sealing ring each encircling the outlet fitting, the water filter cartridge comprising:

an outer housing;

a water filtration media inside the housing;

a filter cap affixed to an end of the housing to enclose the filtration media within the housing, the filter cap comprising:

a first wall defining a first, larger diameter recess configured to receive the male inlet fitting during use and form a water tight seal with the first sealing ring, the first wall having a leak indicator passageway extending therethrough, the leak indicator passageway located such that during use a bottom of a first end of the passageway opens onto the first recess between a top portion of the first sealing ring and a top rim of the first wall;

a second wall defining a second, smaller diameter recess configured to receive the male outlet fitting during use, the second wall forming part of a groove for a fourth sealing ring that seals against the male outlet fitting during use, the second wall having a bypass recess extending along a predetermined length of the second recess a distance sufficient to allow water to bypass the second and third sealing rings during use.

42. The water filter cartridge of claim 41, wherein the leak indicator passageway opens onto the top rim of the first wall.

43. The water filter cartridge of claim 41, wherein the leak indicator passageway has closed sidewalls to form a tunnel through the first wall.

44. The water filter cartridge of claim 41, wherein the first sealing ring is an O-ring having an undeformed diameter D and wherein the bottom of the first end of the leak indicator passageway opens between a location that is at about the top of the first sealing ring during use, and a location 0.2 D below the top of the first sealing ring during use.

* * * * *